United States Patent
Hanson et al.

(10) Patent No.: US 11,867,341 B2
(45) Date of Patent: Jan. 9, 2024

(54) TREATING FLUIDIC CHANNELS

(71) Applicant: ACULON, INC, San Diego, CA (US)

(72) Inventors: Eric Hanson, Carlsbad, CA (US); Eric Bruner, La Jolla, CA (US)

(73) Assignee: ACULON INC., San Diego, CA (US)

(*) Notice: Subject to any disclaimer, the term of this patent is extended or adjusted under 35 U.S.C. 154(b) by 969 days.

(21) Appl. No.: 16/698,503

(22) Filed: Nov. 27, 2019

(65) Prior Publication Data

US 2020/0166173 A1 May 28, 2020

Related U.S. Application Data

(62) Division of application No. 13/507,981, filed on Aug. 10, 2012, now abandoned.

(60) Provisional application No. 61/574,935, filed on Aug. 11, 2011.

(51) Int. Cl.
| | |
|---|---|
| *B05D 7/00* | (2006.01) |
| *F16L 58/08* | (2006.01) |
| *B05D 1/18* | (2006.01) |
| *B82Y 40/00* | (2011.01) |
| *B82Y 30/00* | (2011.01) |
| *B05D 7/22* | (2006.01) |

(52) U.S. Cl.
CPC .............. *F16L 58/08* (2013.01); *B05D 1/185* (2013.01); *B05D 7/225* (2013.01); *B05D 7/544* (2013.01); *B82Y 30/00* (2013.01); *B82Y 40/00* (2013.01); *B05D 7/222* (2013.01); *B05D 2201/02* (2013.01); *B05D 2202/00* (2013.01); *B05D 2254/04* (2013.01)

(58) Field of Classification Search
CPC .... B05D 7/225; B05D 7/544; B05D 2201/02; B05D 2202/00; B05D 2254/04
See application file for complete search history.

(56) References Cited

U.S. PATENT DOCUMENTS

| | | |
|---|---|---|
| 5,119,116 A | 6/1992 | Yu |
| 6,470,144 B1 | 10/2002 | Tarutani et al. |
| 6,587,343 B2 | 7/2003 | Novotny et al. |
| 7,156,117 B2 | 1/2007 | Bohm |
| 7,517,546 B2 | 4/2009 | Hofer |
| 2003/0105513 A1 | 6/2003 | Moriuchi et al. |
| 2003/0186914 A1* | 10/2003 | Hofer ............... B82Y 15/00 850/52 |
| 2004/0236415 A1 | 11/2004 | Thomas |
| 2007/0092640 A1 | 4/2007 | Bruner et al. |
| 2008/0131701 A1* | 6/2008 | Hanson ............. B82Y 30/00 428/425.9 |
| 2008/0152930 A1 | 6/2008 | Hanson et al. |
| 2011/0070357 A1* | 3/2011 | Mitchell ............. A61L 31/16 427/2.25 |
| 2013/0037161 A1 | 2/2013 | Hanson et al. |

FOREIGN PATENT DOCUMENTS

KR 2006088699 A 8/2006

* cited by examiner

*Primary Examiner* — Hai Y Zhang
(74) *Attorney, Agent, or Firm* — Blynn L. Shideler; Krisanne Shideler; BLK Law Group

(57) ABSTRACT

Disclosed is the treatment of the interior walls of a fluidic channel with a self-assembled monolayer of an organophosphorus acid.

15 Claims, No Drawings

TREATING FLUIDIC CHANNELS

CROSS REFERENCE TO RELATED APPLICATION

The present application is a divisional of U.S. patent application Ser. No. 13/507,981, filed Aug. 10, 2012, entitled "TREATING FLUIDIC CHANNELS", which published Feb. 14, 2013 as publication no 2013-0037161 and which application in turn claims priority from U.S. Provisional Patent Application Ser. No. 61/574,935, filed Aug. 11, 2011.

FIELD OF THE INVENTION

The present invention relates to the treatment of fluidic channels such as those in a closed system where a fluid such as a liquid or a gas is circulated for cooling purposes, or an open system where the channel is connected at one end to a material source and at the other end to an opening such as a nozzle for distributing the material. More particularly, this invention relates to treating the interior walls of a fluidic channel with a substance that repels the fluid from the interior walls thereby preventing interaction between the fluid and the interior walls.

BACKGROUND OF THE INVENTION

Controlling the movement of fluids through channels is important in a number of technologies. Often surface effects of the channel adversely affect the fluid flow. Metals such as steel and aluminum are common industrial fluidic channel materials and can have unbound electrons; exposed polar molecules that can generate a surface charge and become reactive with the fluid. This reactivity can impede flow and even form a deposit within the channel further impeding flow. Also, in the case of an open system, such reactivity can result in unwanted materials passing through the open end of the channel.

To overcome this problem, the channel material can be selected from an inert material such as a noble metal that is prohibitively expensive, or an inert polymeric material that may not be suitable for high temperature applications.

Coating the interior walls of the channel with a coating that would repel the fluids may not be satisfactory, particularly with microchannels, because the thickness of the conventional coatings may itself impede flow.

SUMMARY OF THE INVENTION

The present invention is a method of depositing a thin coating of nano dimensions within a fluidic channel comprising:
(a) contacting the interior walls of the fluidic channel either directly or indirectly through an organometallic coating with a solution of an organophosphorus acid in a diluents,
(b) removing the diluent, and
(c) forming a self-assembled monolayer of the organophosphorus acid on the interior walls of the fluidic channel.

By being of nano dimensions, the self-assembled monolayers do not substantially physically impede fluid flow. Also, the organo groups of the self-assembled monolayer are selected so as to repel the fluid, for example, if the fluid is a polar substance such as a water glycol mixture used as a coolant in radiators, the organo groups can be long chain hydrocarbons and/or fluoro-substituted hydrocarbons that make the self-assembled monolayer hydrophobic.

DETAILED DESCRIPTION

For purposes of the following detailed description, it is to be understood that the invention may assume various alternative variations and step sequences, except where expressly specified to the contrary. Moreover, other than where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

The term "acid" is meant to include substances that donate a proton in a chemical reaction to a base. The term acid also includes "acid derivative" that is a material that behaves similarly to an acid such as acid salts, and acid esters, particularly lower alkyl esters containing from 1 to 4 carbon atoms.

The expression "self-assembled monolayer adhered to the interior walls of the fluidic channel or to the intermediate organometallic coating" means that adherence may be through physical attraction or through chemically bonding. With physical attraction it is believed the organophosphorus acid is in the form of the acid. In the case of chemical bonding it is believed the acid forms an ionic or covalent bond with reactive groups on the interior walls of the fluidic channel or the organometallic coating.

The term "solutions" is meant to include homogeneous mixtures of one substance in another. Liquid solutions are optically clear because the particle size of the dissolved material is less than the wavelength of visible light. The term solution also includes "dispersions" that are non-homogeneous mixtures of one substance in another. Liquid dispersions are translucent and also include emulsions that are optically opaque because the particle size of the dispersed particle is greater than the wavelength of visible light. The dispersed material itself may be of such particle size or it may associate with itself or the dispersing medium forming micelles.

The term "diluent" is meant to include a solvent and a dispersant.

The term "metal" is meant to include metals, metal compounds, metal alloys and metalloids.

The term "fluidic channel" or "fluid channel" means a conduit, usually enclosed and of circular, oval or rectangular configuration through which a fluid such as a liquid or gas is passed. The fluidic channel may be associated with a closed circuit in which the fluid circulates through a loop in a substantially continuous manner such as a loop associated with a radiator, or an open circuit in which the fluid flows from a source to an open end or nozzle end such as a fluidic channel associated with a dispensing device or means such as the printing head of an inkjet printer. Other examples of fluidic channels are stencils, needles and microchannels that are micro-dimension fluidic channels such as those associated with DNA chips (microarrays).

The fluidic channel may be made from metal or a polymer. Examples of metals are tantalum, aluminum, copper, titanium, and iron and alloys of such metals, such as steel, including stainless steel, and brass. The invention is particularly useful with materials that contain surface hydroxyl or oxide groups such as native oxide layers associated with many metals and their alloys. The invention is also useful with polymeric materials that have reactive functional groups. Examples are polymers that contain hydroxyl groups such as acrylic polymers made from one or more monomers containing hydroxyl groups.

The organophosphorus acid may be an organophosphoric acid, an organophosphonic acid or an organophosphinic acid. The organo groups may be monomeric or polymeric.

Examples of monomeric phosphoric acids are compounds or mixtures of compounds having the following structure:

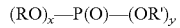

$(RO)_x$—$P(O)$—$(OR')_y$ wherein x is 1-2, y is 1-2 and x+y=3, R preferably is a radical having a total of 1-30, preferably 6-18 carbons, where R' is H, a metal such as an alkali metal, for example, sodium or potassium or lower alkyl having 1 to 4 carbons, such as methyl or ethyl. Preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety. At least one of the organo groups can contain terminal or omega functional groups as described below.

Examples of monomeric phosphonic acids are compounds or mixtures of compounds having the formula:

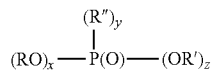

wherein x is 0-1, y is 1, z is 1-2 and x+y+z is 3. R and R" preferably are each independently a radical having a total of 1-30, preferably 6-18 carbons. R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety. At least one of the organo groups can contain terminal or omega functional groups as described below.

Examples of monomeric phosphinic acids are compounds or mixtures of compounds having the formula:

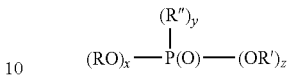

wherein x is 0-2, y is 0-2, z is 1 and x+y+z is 3. R and R" preferably are each independently radicals having a total of 1-30, preferably 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include fluoro and perfluoro such as $CF_3(C_nF_{2n})CH_2CH_2PO_3H_2$. At least one of the organo groups can contain terminal or omega functional groups as described below. Examples of terminal or omega functional groups include carboxyl such as carboxylic acid, hydroxyl, amino, imino, amido, thio and phosphonic acid.

Representative of the organophosphorus acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid.

In addition to the monomeric organophosphorus acids, oligomeric or polymeric organophosphorus acids resulting from self-condensation of the respective monomeric acids may be used. A preferred oligiomeric group is where R and/or R" is a group of the structure:

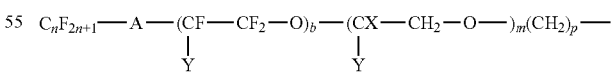

where A is an oxygen radical or a chemical bond; n is 1 to 20; Y is H, F, $C_nH_{2n+1}$ or $C_nF_{2n+1}$; X is H or F; b is at least 1, m is 0 to 50, and p is 1 to 20.

The organophosphorus acid is typically dissolved or dispersed in a diluent to form a solution. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran. Also, aqueous alkaline solutions such as sodium and potassium hydroxide can be used as the diluent.

Adjuvant materials may be present in the solution. Examples include surface active agents, stabilizers, wetting agents and anti-static agents. The adjuvants if present are present in amounts of up to 30 percent by weight based on the non-volatile content of the organic acid composition.

The concentration of the organophosphorus acid in the solution is not particularly critical but is at least 0.01 millimolar, typically 0.01 to 100 millimolar, and more typically 0.1 to 50 millimolar. The solution can be prepared by mixing all of the components at the same time or by adding the components in several steps.

The organophosphorus acid solution can be contacted with the interior walls of the fluidic channel typically by pumping the solution through the channel, removing the organophosphorus acid from the channel and evaporating the solvent at ambient temperatures or by the application of heat.

The resultant layer typically is of nano dimensions, having a thickness of no greater than 100, typically about 10-100 nanometers or less. The layer may be hydrophobic, having a water contact angle greater than 70°, typically from 75-130°. The water contact angle can be determined using a contact angle goniometer such as a TANTEC contact angle meter Model CAM-MICRO.

As mentioned above, the organophosphorus acid can be applied directly to the fluidic channel or can be applied indirectly to the fluidic channel through an intermediate organometallic coating. When better adhesion and durability is desired, an organometallic coating should be applied to the metal substrate followed by application of the organophosphorus acid.

The organometallic compound is preferably derived from a metal or metalloid, preferably a transition metal, selected from Group III and Groups IIIB, IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. Niobium is also a suitable metal. The organo portion of the organometallic compound is selected from those groups that are reactive with the organophosphorus acid. Also, as will be described later, the organo group of the organometallic compound is believed to be reactive with groups on the surfaces being treated such as oxide and hydroxyl groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include:

a. alkoxylates of titanium and zirconium having the general formula $M(OR)_4$, wherein M is selected from Ti and Zr and R is $C_{1-18}$ alkyl, b. polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, halo, keto, carboxyl or amino groups capable of donating electrons to titanium. Examples of these chelates are those having the general formula

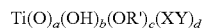

wherein a=4-b-c-d; b=4-a-c-d; c=4-a-b-d; d=4-a-b-c; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine, ii. 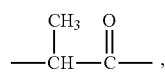 e.g., of lactic acid, iii. 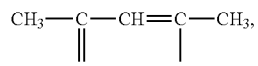 e.g., of acetylacetone enol form, and iv. 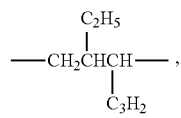 e.g., as in 1,3-octyleneglycol, d. titanium acrylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound can be dissolved or dispersed in a diluent to form a solution. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound can be used neat and applied by vapor deposition techniques.

Also, adjuvant materials may be present in the solution. Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. If the organometallic compound chosen is reactive with moisture, (e.g. in the case of titanium (IV) n-butoxide, tantalum (V) ethoxide, aluminum (III) isopropoxide etc,) care should be taken that moisture is not introduced with the diluent or adjuvant materials and that mixing is conducted in a substantially anhydrous atmosphere.

The organometallic solution can be applied to the fluidic channel surface by pumping the solution through the channel. The solution removed from the channel and the diluent evaporated. This can be accomplished by heating to 50-200° C. or by simple exposure to ambient temperature, that is, from 20-25° C. Alternately, the organometallic compound can be vaporized and the vapor passed through the fluidic channel. The resulting film may in the form of a polymeric metal oxide with unreacted alkoxide and hydroxyl groups. This is accomplished by depositing the film under conditions resulting in hydrolysis and self-condensation of the alkoxide. These reactions result in a polymeric coating being formed. The conditions necessary for these reactions to occur is to deposit the film in the presence of water, such as a moisture-containing atmosphere, however, these reactions can be performed in solution by the careful addition of water. The resulting film has some unreacted alkoxide groups and/or hydroxyl groups for subsequent reaction and possible covalent bonding with the organophosphorus acid. Although not intending to be bound by any theory, it is believed the polymeric metal oxide is of the structure:

$$[M(O)_x(OH)_y(OR)_z]_n$$

where M is the metal of the invention, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2, such as 2 to 1000.

When the organometallic compound is used neat and applied by chemical vapor deposition techniques in the absence of moisture, a thin metal alkoxide film is believed to form. Polymerization, if any occurs, is minimized and the film may be in monolayer configuration. The resulting film typically has a thickness of 0.5 to 100 nanometers. When the organometallic compound is subjected to hydrolysis and self-condensation conditions as mentioned above, somewhat thicker films are formed.

Although not intending to be bound by any theory, it is believed the acid groups of the organophosphorus acid chemically bond with the oxide or hydroxyl groups on the surface of the substrate being treated or chemically bond with the hydroxyl or alkoxide group of the organometallic coating, resulting in a durable film. It is believed that the organophosphorus acid forms a self-assembled monolayer on the surface of the substrate. Self-assembled layers or films are formed by the adsorption and spontaneous organization of the material on the surface of the substrate. The organophosphorus acids useful in the practice of the invention are amphiphilic molecules that have two functional groups. The first functional group, i.e., the head functional group, is the polar phosphorus acid group and attaches by physical attraction or by chemical bonding to the surface of the substrate. The second functional group, the organophosphorus acid group, i.e., the tail, extends outwardly from the surface of the substrate. If the omega or terminal portion of the tail contains a functional group such as those mentioned above, the organophosphorus layer can serve as an anchor or primer for a subsequently applied coating with coreactive functional groups. As an example, the organophosphorus acid can contain terminal amino and/or carboxylic acid groups and the subsequently applied layer can be an epoxy containing resin or polymer. The amino and/or carboxylic acid groups are reactive with the epoxy groups resulting in a multilayer coating with good adhesion between the organophosphorus layer and the subsequently applied layer obtained from the epoxy resin or polymer.

The invention is now set forth in the following claims.

The invention claimed is:

1. A method of depositing a coating of nanometer dimensions onto interior walls within a fluidic channel comprising:

a) Providing an open fluidic channel with an open end having a nozzle or dispensing device, wherein fluid flows from a source through the fluidic channel to the open end with the nozzle or dispensing device;

b) contacting the interior walls of the fluidic channel either directly, or indirectly through an intermediate organometallic coating, with a solution comprising a diluent and an organophosphorus acid by pumping the solution through the fluidic channel;

c) removing the solution from the fluidic channel; and d) evaporating the diluent from the interior walls of the fluidic channel to form a self-assembled monolayer of the organophosphorus acid chemically bonded via an ionic or covalent bond with reactive groups on one of the interior walls of the fluidic channel or the intermediate organometallic layer.

2. The method of claim 1 wherein the open fluidic channel is associated with a dispensing device comprising a microarray of microchannels.

3. The method of claim 1 wherein the open fluidic channel is made from metal.

4. The method of claim 3 wherein the metal is titanium or tantalum.

5. The method of claim 3 wherein the metal is aluminum, copper, iron, or an alloy thereof.

6. The method of claim 5 wherein the metal is a metal alloy.

7. The method of claim 6 wherein the metal alloy is stainless steel.

8. The method of claim 1 further including the step of applying an intermediate organometallic coating to the interior of the fluidic channels wherein the organophosphorus acid is contacted with the intermediate organometallic layer.

9. The method of claim 8 wherein the organometallic coating is a polymeric metal oxide having unreacted alkoxide and/or hydroxyl groups.

10. The method of claim 9 wherein the fluidic channel is made from a polymeric material.

11. The method of claim 1 wherein the organophosphorus acid is an organophosphonic acid.

12. The method of claim 1 wherein the organophosphorus acid is an organophosphonic acid or derivative thereof comprising a compound or a mixture of compounds of the structure:

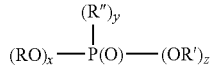

wherein x is 0 to 1, y is 1, z is 1 to 2 and x+y+z=3; R and R" are each independently a hydrocarbon or substituted hydrocarbon radical having a total of 1 to 30 carbon atoms or an oligiomeric group, R' is H, a metal or lower alkyl.

13. The method of claim 12 where R and R" are each independently a fluorine-substituted hydrocarbon radical.

14. The method of claim 12 wherein R and/or R" is a group of the structure:

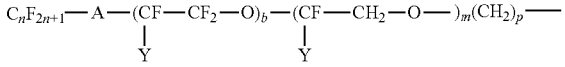

where A is an oxygen radical or a chemical bond; n is 1 to 6; Y is F or $C_nF_{2n+1}$; b is 2 to 20, m is 0 to 6 and p is 0 to 18.

15. The method of claim 1 wherein the self-assembled monolayer of the organophosphorus acid has terminal functional groups that are reactive with functional groups in a subsequently applied coating.

\* \* \* \* \*